United States Patent
Degen

(10) Patent No.: US 6,614,016 B1
(45) Date of Patent: Sep. 2, 2003

(54) METHOD FOR OPTICALLY DETERMINING THE POSITION OF A MOVEMENT ELEMENT AND SENSOR FOR IMPLEMENTING THE METHOD

(75) Inventor: Martin Degen, Bad Homburg (DE)

(73) Assignee: Mannesmann VDO AG, Frankfurt am Main (DE)

( * ) Notice: Subject to any disclaimer, the term of this patent is extended or adjusted under 35 U.S.C. 154(b) by 249 days.

(21) Appl. No.: 09/718,596

(22) Filed: Nov. 22, 2000

(30) Foreign Application Priority Data

Nov. 24, 1999 (DE) .......................... 199 56 557

(51) Int. Cl.[7] .............................. G01D 5/34; G02B 6/00
(52) U.S. Cl. .............................. 250/231.1; 250/214 PR; 250/231; 385/36; 385/140
(58) Field of Search ................................ 385/31, 33–36, 385/39, 12, 13, 15, 25, 140; 250/231.1, 214 PR, 231

(56) References Cited

FOREIGN PATENT DOCUMENTS

| DE | 32 21 621 C2 | 10/1985 | ............ G01D/5/34 |
|---|---|---|---|
| DE | 38 04 098 A1 | 8/1989 | ............ G01B/11/00 |
| DE | 38 16 950 A1 | 11/1989 | ............ G01B/11/00 |
| DE | 3816950 A1 * | 11/1989 | ............ G01B/11/00 |
| DE | 39 24 327 | 10/1990 | ............ G01B/21/00 |
| DE | 41 04 485 A1 | 8/1991 | ............ G01B/7/30 |
| DE | 195 28 704 A1 | 2/1997 | ............ G01B/11/00 |

OTHER PUBLICATIONS

"The Distributed Fibre Optic Sensing Handbook", John P. Dakin, IFS Publications, UK Springer, UK Springer–Verlag, Berlin—Heidelberg—New York—Tokyo, 1990.

* cited by examiner

*Primary Examiner*—Frank G. Font
*Assistant Examiner*—Michael P. Mooney
(74) *Attorney, Agent, or Firm*—Cohen, Pontani, Lieberman & Pavane

(57) ABSTRACT

A method for optically determining the position of a movement element optically includes introducing the light emitted by a light source into an optical conductor which causes attenuation of the light. A light output coupler that moves in accordance with the position of the movement element couples out the light from the optical conductor and feeds the attenuated light to a light detector. Using the ratio of the light intensity emitted by the light source and that registered by the light detector, the attenuation of the light is determined and the position of the movement element inferred therefrom. The sensor is usable in an aggressive environment or one susceptible to interference because of the light source and the light detector may be arranged remote from the movement element.

21 Claims, 1 Drawing Sheet

METHOD FOR OPTICALLY DETERMINING THE POSITION OF A MOVEMENT ELEMENT AND SENSOR FOR IMPLEMENTING THE METHOD

BACKGROUND OF THE INVENTION

1. Field of the Invention

The present invention relates to a method for optically determining the position of a movement element with a light source and a light detector in which the characteristic of the light emitted by the light source changes relative to a position of the movement element and is registered by the light detector and used to calculate the position of the movement element. More specifically, the present invention relates to a method for optically determining the position of a movement element in a motor vehicle. The invention additionally relates to an optical sensor for implementing the method.

2. Description of the Related Art

A measurement method using a light source and light detector in which the characteristic of the light changes relative to a position of the movement element is used, for example, in the automobile sector to register rotation of a steering shaft in a motor vehicle and to use it to calculate a torsion torque. For this purpose, the light emitted by the light source falls successively through a first aperture stop connected to the movement element designed as a steering shaft and a second aperture stop connected to a reference point. After passing the second aperture stop, the light is registered by the light detector. An angular offset between the two aperture stops causes the light to be partly or completely shielded, depending on the position of the movement element. The light is registered by the light detector, for example, as a difference in brightness.

The aforementioned method is comparatively well suited to detect any relative offset between the movement element and the reference point during measurements for determining the position of the movement element. However, the sensor requires a large number of aperture stops or the measured values are inaccurate. In addition, a number of light detectors have to be provided depending on the maximum possible movement range of the movement element, which leads to a high manufacturing expenditure and to cumbersome handling.

SUMMARY OF THE INVENTION

The object of the present invention is to provide a method for optically determining a position of a movement element using a light source and a light detector which improves the accuracy of the measured values over the prior art and which is easy to implement.

Another object of the present invention is to provide a device for implementing the inventive method.

A method for optically determining a position of a movement element according to the present invention includes the steps of introducing light from a light source into a measurement section that attenuates the light, attenuating the light by the measurement section in accordance with the position of the movement element, registering the attenuated light by a light detector, and inferring the position of the movement element from the attenuation of the light by a computing unit.

The inventive method permits an exact and stepless determination of the position of the movement element even under unfavorable physical conditions. Furthermore, the position is determined using only one light detector so that the measurement method is implemented with a low outlay. The requirement of additional aperture stops which intervene in the beam path of the light is obviated by the present invention. In addition, the measurement accuracy is independent of the maximum movement range of the movement element, so that even comparatively large adjustment ranges can be registered without difficulty. The method may be used in those applications in which an aggressive environment rules out the use of electrical components and in which a non-contacting measurement method is desired to avoid wear or influences of the measurement method on the movement element.

The measurement section may be flexibly or, resiliently deformable to achieve a change in the attenuation of the light in accordance with the position of the movement element. On the other hand, a preferred embodiment of the present invention includes initially introducing the light from the light source into an optical conductor, coupling out the light from the optical conductor in accordance with the position of the movement element and feeding the light to the light detector. In this case, a length of the path traced by the light in the optical conductor is changed by the movement element, thereby causing a different attenuation of the light that is used for determining the position. As a result, even a comparatively large movement range which may also have an desired spatial course, for example, can be implemented. The movement element may also be connected to the optical conductor such that the movement element permits the light to emerge only in a respectively current position of the optical conductor while the remaining region of the optical conductor is covered for preventing the light from emerging from the remaining region.

If a light source with a known light intensity is used, the position of the movement element may be inferred by the light intensity registered by the light detector. In a preferred embodiment, the position of a movement element may be optically determined by comparing the light emitted by the light source and the light registered by the light detector with each other and determining the position of the movement element from the differential value. Accordingly, different light sources may be used in the method, the light intensities of which do not have to be known at the start. In this embodiment, the light from an external light source or even the ambient brightness may be used for implementing the inventive measurement method.

In a further embodiment, the attenuation of the light is determined by the deviation of the brightness and color spectrum of the light emitted between the light source and the light registered by the light detector. In this embodiment, the accuracy of the measurement method is improved by the position of the movement element being inferred from both the brightness difference and the color difference. A deviation in the respectively determined values may be indicated to the user as a fault message in the event of an impermissible deviation.

According to the present invention, an optical sensor for determining the position of the movement element by a light source and a light detector to implement the above described method includes an optical conductor that is connectable to the light source and effects the attenuation of the light, and a light output coupler which moves in accordance with the actuating position of the movement element for transmitting the attenuated light to the light detector.

The determination of the position of the movement element is effected in a simple way from the increased attenuation of the light given an increase in the path which the light traces before being coupled out. The light output coupler may be moved along the optical conductor together with the movement element. In this case, even a large movement range of the movement element requires only one light detector. Accordingly, the sensor is simple to manufacture and requires little space. In addition, both the position of a movement element that is translationally displaced and one which is pivoted about an axis may be registered. In fact, the movement element may follow any desired spatial movement path.

In a preferred embodiment, the optical conductor has an annular or arcuate shape to determine the position of a movement element which is deflected about a shaft. Even small angular changes may be reliably registered using this configuration. The light output coupler may be moved, for example, along the optical conductor similar to a pointer flag by the movement element for coupling out the light reliably in accordance with the position of the movement element. The action of coupling the light out may be performed at any desired outer surface of the optical conductor so that the optical sensor is adaptable to the respectively provided installation position.

In a further embodiment of the present invention, the light output coupler transmits the light from a first optical conductor to a second optical conductor for conducting the light back to the light detector.

In this embodiment, a compact embodiment of the optical sensor is produced in which the light source and the light detector are centrally arranged as a common structural unit. The sensor may be used in applications in which the use of electrical or metallic components or materials is not possible or causes interference in the region of the movement element. The light source and the light detector may also be arranged centrally. Furthermore, the light source and the light detector may also be used for determining the position of further movement elements. The second optical conductor may be subjected to attenuation of the light and therefore serve as a lengthened measurement section. However, the second optical conductor may also be designed to be largely free of light losses.

Accordingly, in a further embodiment of the present invention, the two optical conductors form an essentially common structural unit in which the optical conductors are arranged so that they are optically separated from each other. This structural unit which may be deformed allows the trouble-free use of the optical sensor with existing movement elements. The light coupled into the first optical conductor is transmitted to the second optical conductor by the light output coupler with a reversal of the direction of light transmission. Accordingly, the light may be fed to the light detector which is arranged immediately adjacent to the light source.

In another embodiment of the invention, the optical conductors are connected to each other by the light output coupler to determine the position of the movement element. An arrangement of this type of the optical conductors and of the light output coupler allows a simple registration of torques. For example, the optical conductors may be arranged on the outside of a shaft and the light output coupler may be fixed at a short distance from the optical conductors on a sleeve or bearing housing surrounding the shaft.

In this case, it is particularly helpful if the light output coupler has a reflective face. The light transmitted into the optical conductor by the light source and emerging uniformly at an outer face of the optical conductor is deflected by the reflective face of the light output coupler and fed to the light detector. To this end, the movement element itself may be provided directly with the reflective face.

In a further embodiment of the present invention, the light output coupler may include a prism. The prism is optimally suited to transmit the light coupled into the optical conductor essentially without losses to a second optical conductor to achieve the simple return of the attenuated light.

The light coupled in by the light source may emerge uniformly as a result of an appropriate finish on the outer face of the optical conductor and can therefore effect the attenuation of the light. By contrast, another embodiment of the present invention is provided by the optical conductor having additives which restrict the transmissivity of light and are incorporated to attenuate the light. In this embodiment, uniform attenuation of the light, the intensity of which being adjustable, is achievable independent of the shape of the optical conductor.

In yet a further embodiment of the present invention, the additives in the optical conductor are provided with colored particles. The redundant measurement of both the color spectrum changed by the optical conductor and the brightness difference caused by the optical conductor allows detection of faulty measurements which may, for example, be caused by stray light. In addition, potential measurement errors and damage to the sensor may be detected and, for example, fed to a diagnostic system.

By contrast, it is particularly simple if the optical conductor has a suitable surface finish on at least one outer face at which a proportion of the light being radiated into the optical conductor by the light source emerges to attenuate the light. In this way, the attenuation of the light is provided in a simple way by the light loss at the outer face of the optical conductor. Accordingly, a conventional optical conductor may be used.

The light output coupler may be placed on the surface of the optical conductor. Alternatively, the light output coupler may be arranged so that it moves at a short distance from the optical conductor. In this embodiment, any possible frictional resistance is effectively prevented. Therefore, faulty registration of a measured value caused by frictional resistance is ruled out. This embodiment also avoids any detrimental characteristics caused by wear.

Potential deviations caused by external incident light in determining the position of the movement element may be effectively prevented by the optical conductor having a covering to protect it against the external incident light. When this covering is used, additional protective measures against the undesirable irradiation of light are not necessary and the sensor may be used even with a high ambient brightness.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters are to denote similar elements throughout the several views.

DETAILED DESCRIPTION OF THE PRESENTLY PREFERRED EMBODIMENTS

Figure 1:
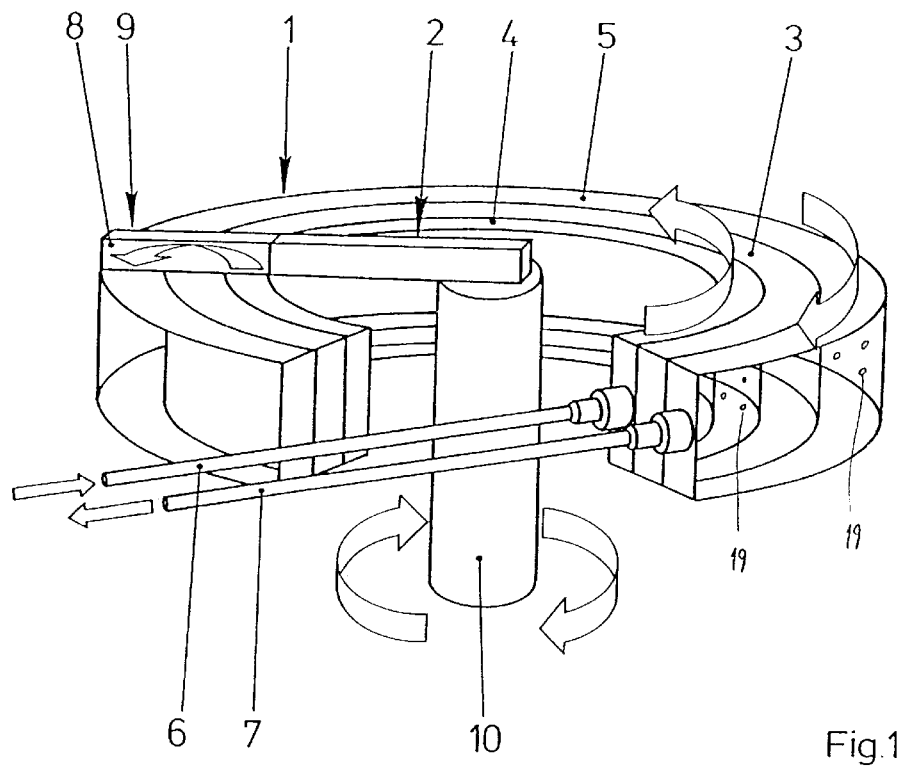
FIG. 1 is a perspective view showing an optical sensor according to an embodiment of the present invention for a movement element that can pivot about a shaft.

FIG. 1 shows an optical sensor 1 and a movement element 2 according to an embodiment of the present invention. The optical sensor 1 includes a measurement section including first and second annular optical conductors 4, 5 which are concentrically arranged and are insulated optically from each other by a dividing layer 3. The first and second annular optical conductors 4, 5 are connected to respective first and second optical waveguides 6, 7. The first optical waveguide 6 connects the optical conductor 4 to a light source (not illustrated) which accordingly radiates light into the optical conductor 4. By contrast, the second optical conductor 5 is connected by the optical waveguide 7 to a light detector (likewise not illustrated). A light output coupler 9 provided with a prism 8 couples the light radiated into the first optical conductor 4 to the second optical conductor 5. The first and second optical conductors 4, 5 are each subject to attenuation of the light by colored particles 19 distributed in each of the first and second optical conductors. The light output coupler 9 is arranged to move with the movement element 2. The respective position of the light output coupler 9 is determined on the basis of the attenuation of the light registered by the light detector. In this way, the position of the movement element 2 that bears the light output coupler 9 and is arranged such that it is pivotally movable about a shaft 10 is simultaneously determined.

Figure 2:
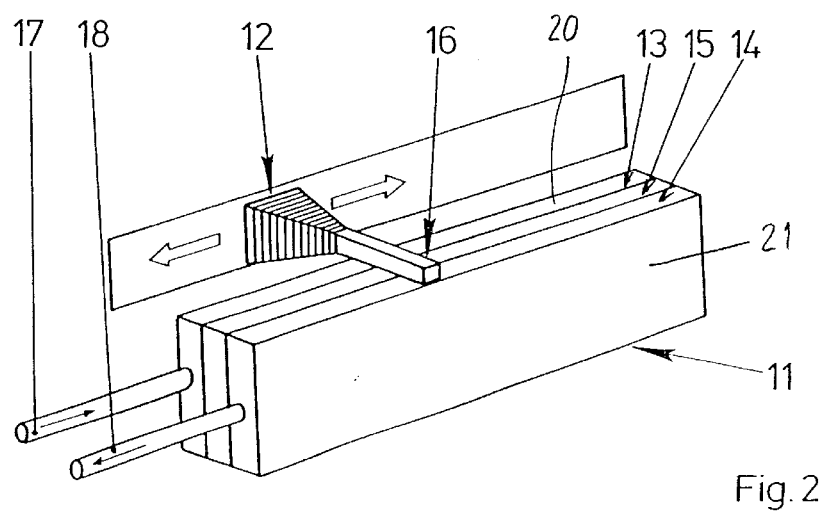
FIG. 2 is a perspective view showing a further optical sensor for a movement element which can be displaced translationally.

FIG. 2 shows an optical sensor 11 for determining the position of a movement element 12 which is translationally displaceable. To this end, the sensor 11 has two parallel optical conductors 13, 14 which are insulated optically from each other by a dividing layer 15. A light output coupler 16 os arranged on a side of the movement element 12. The light output coupler 16 couples the light from the first optical conductor 13 to the second optical conductor 14 via a reflective face. The first optical conductor 13 is connected by a first optical waveguide 17 to a light source (not illustrated) and the second optical conductor 14 is connected by a second optical waveguide 18 to a light detector (likewise not illustrated). The light is attenuated in this embodiment by a suitable surface finish 20 arranged on the first optical conductor 13 allows a proportion of the light being radiated into the optical conductor 13 to emerge from the first optical conductor into the light output coupler 16. The proportion of light allowed to pass through the surface finish is dependent on the position of the light output coupler 16, thereby allowing the position of the light output coupler 16 and the movement element 12 to be determined. Furthermore, the position of the light output coupler and movement element 12 may be determined without contact so that the electrical components such as the light source and the light detector may be arranged outside the movement range of the movement element 12. Accordingly, the sensor 11 may be used in an aggressive environment or one susceptible to interference.

The first and second optical conductors 13, 14 may also include a cover 21 for protection against external incident light.

Instead of reflective face, the light output coupler 16 may alternatively comprise a prism 8 as shown in FIG. 1.

Furthermore, the reflective face may also be used in the light output coupler 9 in the embodiment of FIG. 1. Also, the optical conductors 13, 14 in FIG. 2 may alternatively or additionally comprise the particles 19 for attenuating the light transmitted therethrough as the optical conductors 3, 4 in FIG. 1. Of course the optical conductors 3, 4 may include a suitable surface finish for attenuating light instead of or in addition to including the colored particles.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A method for optically determining a position of a movement element using a light source and a light detector, comprising the steps of:

(a) introducing light emitted from a light source into a measurement section by introducing the light from the light source into an optical conductor;

(b) varying an attenuation of the light in the measurement section in accordance with the position of the movement element to produce an attenuated light by coupling out the light from the optical conductor in accordance with the position of the movement element and feeding the attenuated light to a light detector;

(c) registering the attenuated light at the light detector; and (d) inferring the position of the movement element from the attenuated light registered at the light detector in said step (c).

2. The measurement method of claim 1, wherein said step (a) comprises introducing the light from the light source into an optical conductor and said steps comprising coupling out the light from the optical conductor in accordance with the position of the movement element and feeding the attenuated light to the light detector.

3. The measurement method of claim 1, wherein said step (d) comprises comparing the light emitted by the light source and the attenuated light registered by the light detector and determining the position of the movement element from the differential value.

4. The measurement method of claim 1, wherein said step (d) comprises determining the deviation of the brightness and color spectrum of the light emitted by the light source from the brightness and color spectrum of the attenuated light registered by the light detector to determine the position of the movement element.

5. An optical sensor for determining the position of a movement element using a light source and a light detector, comprising:

a first optical conductor operatively arrangeable for receiving light radiated from the light source and effecting an attenuation of the light introduced therein; and a light output coupler arranged for moving along said first optical conductor in accordance with the actuating position of the movement element, said light output coupler being arranged for transmitting the light from said first optical conductor to the light detector, wherein said light output coupler transmits the light from a position on said first optical conductor corresponding to a current position of the movement element and an amount of attenuation of the light effected by said first optical conductor corresponds to the position of the light output coupler on said first optical conductor.

6. The optical sensor of claim 5, wherein said optical conductor comprises one of an annular and arcuate shape and said light output coupler is deflectable about a shaft with the movement element.

7. The optical sensor of claim 5, further comprising a second optical conductor, wherein said light output coupler is operatively arranged for transmitting light from said first optical conductor to said light detector via said second optical conductor.

8. The optical sensor of claim 7, wherein said first and second optical conductors form a common structural unit in which the optical conductors are optically separated from one another.

9. The optical sensor of claim 7, wherein said first and second optical conductors are connected to each other by said light output coupler to determine the position of the movement element.

10. The optical sensor of claim 5, wherein said light output coupler comprises a reflective face.

11. The optical sensor of claim 5, wherein said light output coupler comprises a prism.

12. The optical sensor of claim 5, wherein said first optical conductor comprises additives arranged therein for restricting transmissivity of the light and thereby attenuating the light.

13. The optical sensor of claim 12, wherein said additives include colored particles.

14. The optical sensor of claim 5, wherein said first optical conductor includes a suitable surface finish operatively arranged on at least one outer face to attenuate the light by allowing a proportion of the light to emerge from said first optical conductor.

15. The optical sensor of claim 7, wherein said first optical conductor comprises additives arranged therein for restricting transmissivity of the light and thereby attenuating the light.

16. The optical sensor of claim 15, wherein said additives include colored particles.

17. The optical sensor of claim 7, wherein said first optical conductor includes a suitable surface finish operatively arranged on at least one outer face to attenuate the light by allowing a proportion of the light to emerge from said first optical conductor.

18. The optical sensor of claim 5, wherein said light output coupler is arranged at a short distance from said first optical conductor so that it does not contact said first optical conductor.

19. The optical sensor of claim 5, wherein said first optical conductor includes a covering to protect it against external incident light.

20. A method for optically determining a position of a movement element using a light source and a light detector, comprising the steps of:
(a) introducing light emitted from a light source into a measurement section;
(b) varying an attenuation of the light in the measurement section in accordance with the position of the movement element to produce an attenuated light;
(c) registering the attenuated light at a light detector; and
(d) inferring the position of the movement element from the attenuated light registered at the light detector in said step (c) by comparing the light emitted by the light source and the attenuated light registered by the light detector and determining the position of the movement element from the differential value.

21. A method for optically determining a position of a movement element using a light source and a light detector, comprising the steps of:
(a) introducing light emitted from a light source into a measurement section;
(b) varying an attenuation of the light in the measurement section in accordance with the position of the movement element to produce an attenuated light;
(c) registering the attenuated light at a light detector; and
(d) inferring the position of the movement element from the attenuated light registered at the light detector in said step (c) by determining the deviation of the brightness and color spectrum of the light emitted by the light source from the brightness and color spectrum of the attenuated light registered by the light detector to determine the position of the movement element.

* * * * *